Aug. 2, 1932.   V. G. APPLE   1,870,084
VARIABLE CONDENSER
Filed June 14, 1928   6 Sheets-Sheet 1

INVENTOR
Vincent G. Apple

Aug. 2, 1932.  V. G. APPLE  1,870,084

VARIABLE CONDENSER

Filed June 14, 1928   6 Sheets-Sheet 2

INVENTOR

Patented Aug. 2, 1932

1,870,084

UNITED STATES PATENT OFFICE

VINCENT G. APPLE, OF DAYTON, OHIO

VARIABLE CONDENSER

Application filed June 14, 1928. Serial No. 285,355.

My invention relates broadly to improvements in condensers in which a variation in capacity is obtained by shifting a greater or lesser area of a series of plates of one polarity between a series of plates of opposite polarity, and more particularly to that type having one means whereby the two sets of plates may be rapidly brought to approximately the desired relative position and another means whereby the two sets of said plates may be more slowly but more accurately set in exact relation.

The object of my invention is to provide a rigid, durable and efficient structure wherein the plates may be accurately adjusted to the desired relative position in a minimum of time and with a minimum of mechanism requiring little skill in its operation.

I attain this object by applying the principle illustrated in the following drawings, wherein—

Similar numerals refer to similar parts thruout the several views.

Figure 5:
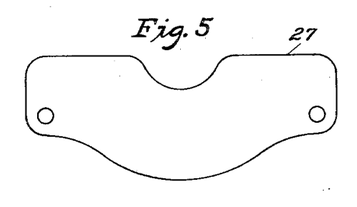
Fig. 5 shows the outline of a condenser plate of one polarity.
Figure 6:
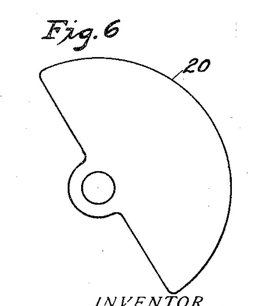
Fig. 6 shows the outline of a condenser plate of opposite polarity.
Figure 7:
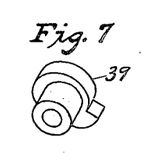
Fig. 7 is a detail of the cam used to obtain accurate relative adjustment of the plates.

As ordinarily constructed, condensers of the general class to which my improvement appertains consist of two principal elements, a rotor of one polarity comprising a series of spaced apart plates somewhat of the outline shown at 20 Fig. 6 mounted on a shaft, and a stator of opposite polarity comprising a series of spaced apart plates, somewhat of the outline shown at 27 Fig. 5 rigidly mounted in a frame, said frame carrying bearings within which the rotor shaft may be revolved and being partly or entirely composed of insulating material to electrically separate the two said elements, the rotor being revolved to vary the portion of its area which extends between the stator plates, whereby the capacity of the condenser is changed within limits at will.

Condensers embodying my improvements do not, in fact, include a stator, since both sets of plates are movable, but for clearness of description the element corresponding to the stator of ordinary practice will be hereinafter so called.

The condenser which I show in Figs. 1 to 7 inclusive embodies my improvement and consists of the customary rotor comprising a series of plates 20, spaced apart by washers 21, on shaft 22. Nuts 23, bearing against collars 24, hold the series of plates together. A dial knob 25 is provided to revolve the rotor shaft and to indicate the rotor position. A frame 26 provides bearings within which the rotor shaft may turn.

The stator comprises a series of plates 27, spaced apart by washers 28 on studs 29 and held together by nut 30. Head 31 (see Fig. 4) and head 18, one at each end as shown, held on by nuts 32, complete the stator unit.

Figure 1:
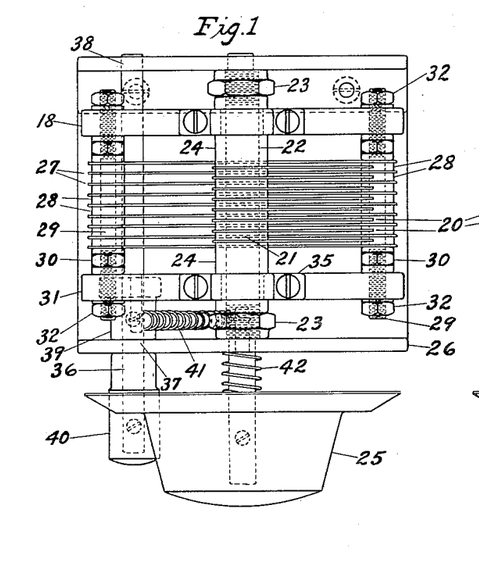
Figs. 1, 2 and 3 are plan, front and side views respectively of a condenser embodying the principle of my invention.
Figures 2, 8:
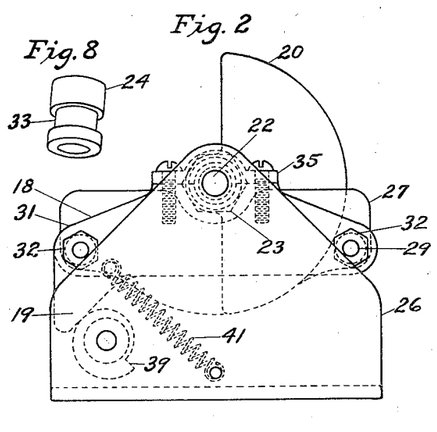
Fig. 8 is a detail of one of the end spacing collars used on the shaft.
Figure 3:
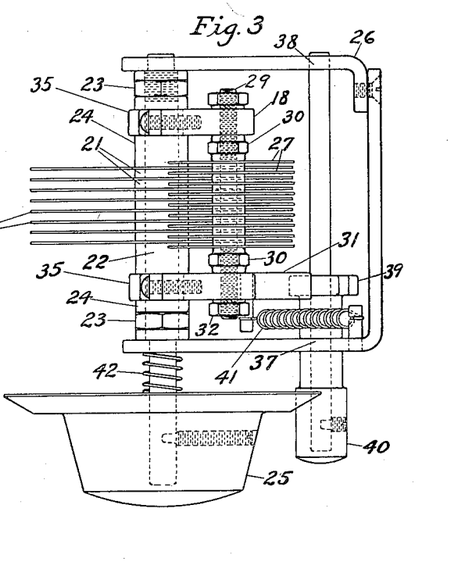
Figure 4:
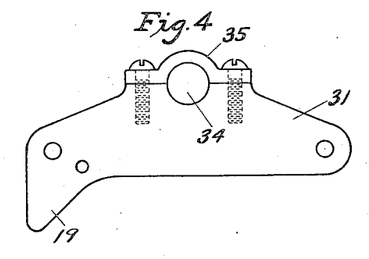
Fig. 4 shows one of the end plates used to support a series of plates of one polarity.

The collars 24, (see Fig. 8) one at each end of the rotor, have a groove 33 of suitable diameter and width to form a journal upon which bearing 34 (see Fig. 4) may turn. By reason of caps 35 being removable from heads 31, the stator may be mounted with bearings 34 in grooves 33, being thus free to revolve about the rotor as shown in Figs. 1, 2 and 3.

A shaft 36, having bearings at 37 and 38 in frame 26, carries a cam 39 (see Fig. 7) which bears against a downwardly extending portion 19 of head 31. A small knob 40 is provided to turn shaft 36, and a spring 41, having one end attached to frame 26 and the other end to head 31, holds head 31 against cam 39. A short coil spring 42 supplies sufficient drag to the rotor so that it may not be readily turned in its bearings except by knob 25.

By reference to the drawings it is apparent that while knob 25 rapidly brings the plates of the rotor into approximately the desired relation with those of the stator, knob 40 actuating cam 39 may be used to more accurately bring about the desired relation, since the rise of cam 39 may be sufficiently small that considerable turning movement of knob 40 is required to but slighthly change said relation.

While in Figs. 1 to 8 inclusive, I show the principle of my invention as applied to a single condenser, it is obvious that the mechanism shown may be extended and applied to a multiple condenser wherein several rotors similar to the one shown may be carried by one and the same shaft and simultaneously rotated by one and the same knob while the several stators may be separately controlled for fine adjustment by providing for each a separate cam and control knob, such as are shown at 39 and 40.

In Figs. 9 to 12 inclusive I embody the principle of my invention in a multiple condenser in which three separate rotor units, each having a series of plates 50 spaced apart by washers 51 and collars 52, 53, etc., are mounted on shaft 54 and held together by nuts 55, the three rotors to be simultaneously revolved by said shaft.

Figure 9:
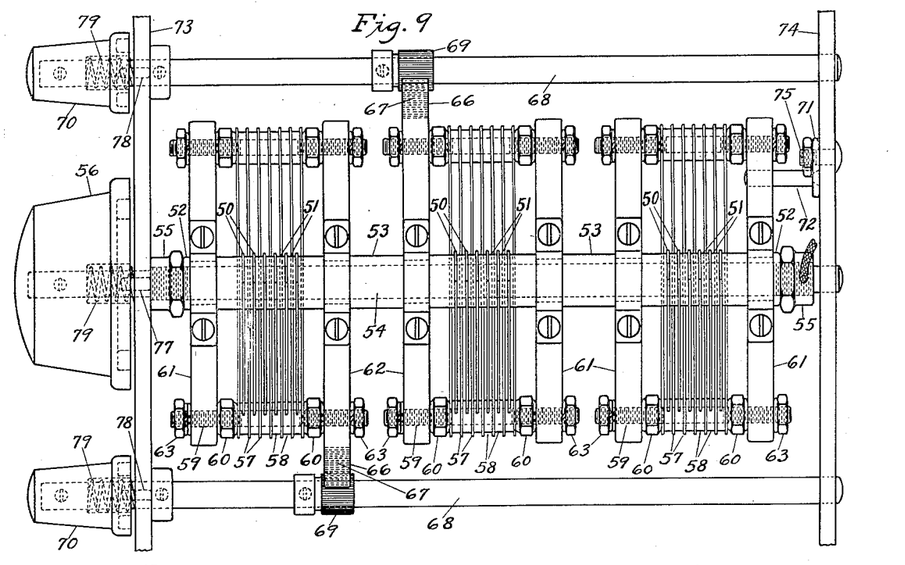
Figs. 9, 10 and 11 are plan, side and front views respectively of a multiple condenser embodying the principle of my invention.
Figure 10:
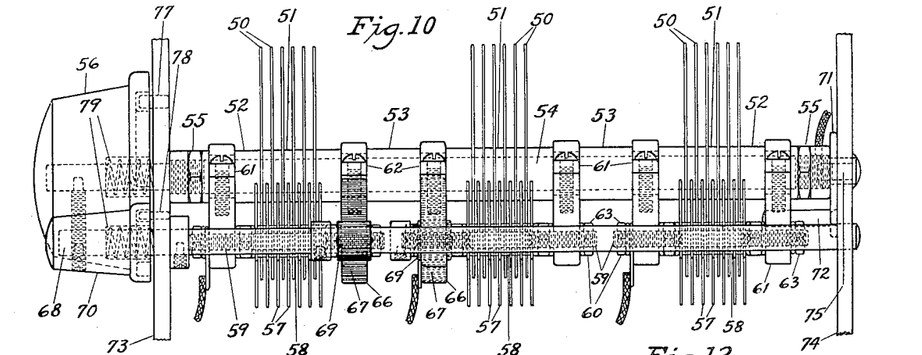
Figure 11:
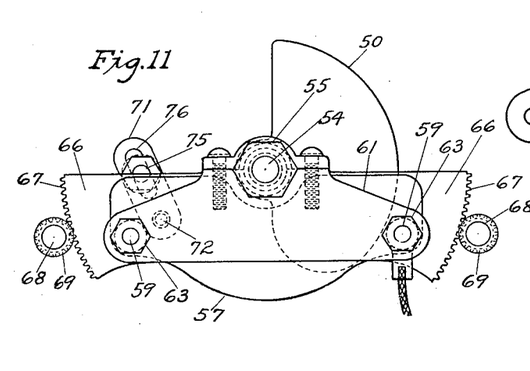
Figure 12:
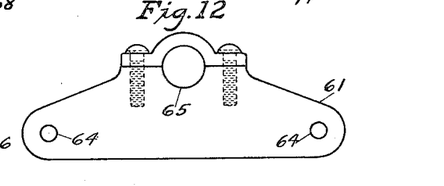
Fig. 12 is an outline of an end plate used to support a series of plates of one polarity.
Figure 13:
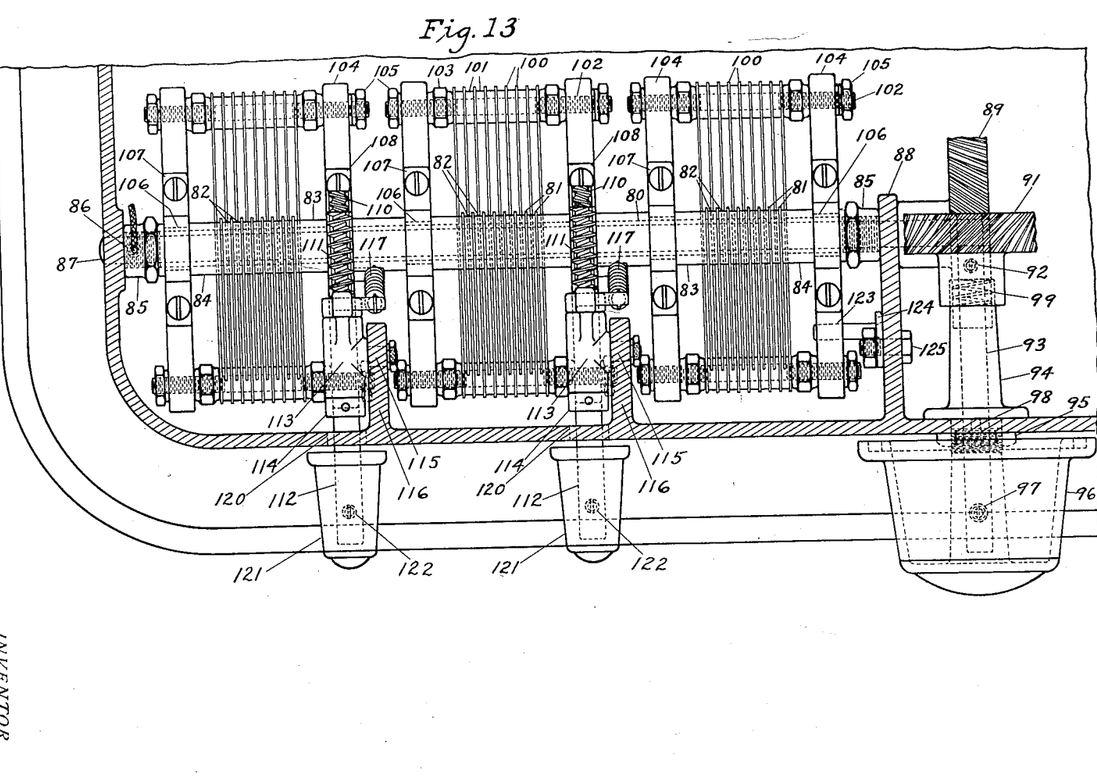
Figs. 13, 14 and 16 are plan, rear and end views respectively of a multiple condenser embodying the principle of my invention adapted to a radio receiver, a cabinet of molded insulating material forming a frame for mounting the condenser and providing space wherein the other elements of the receiver may be housed, the dial whereby the condenser is set being a part of the cabinet.
Figure 14:
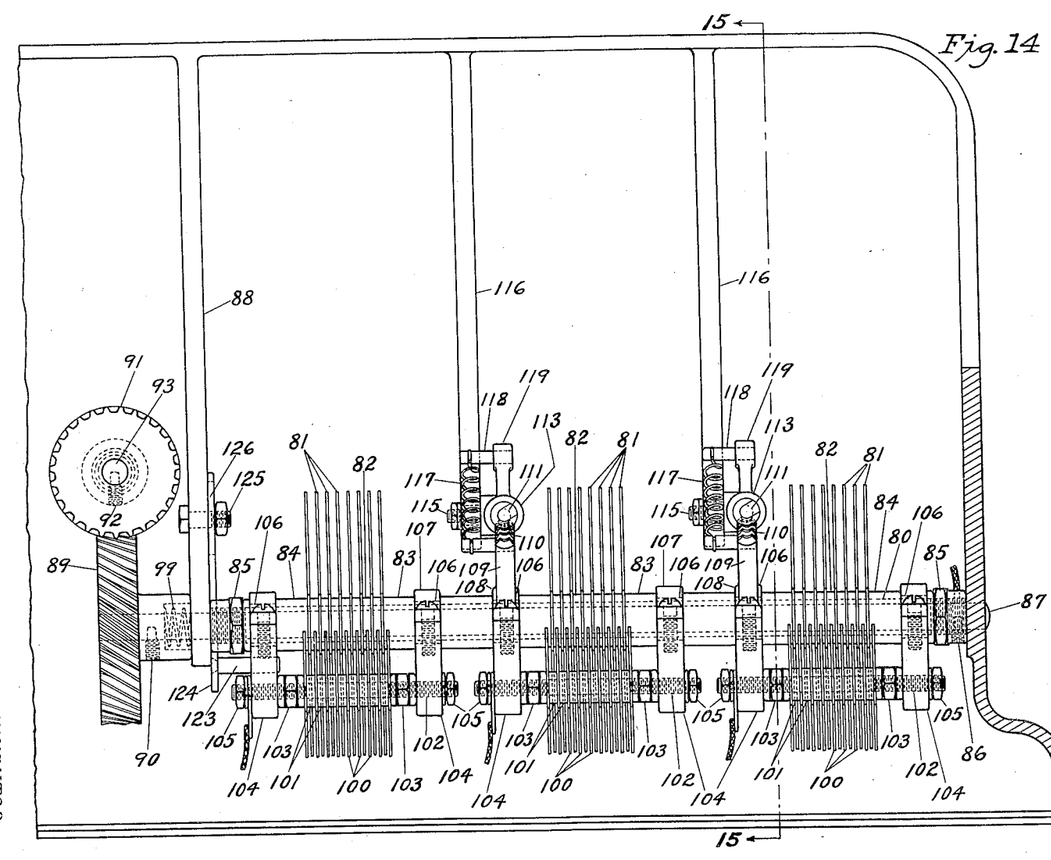
Figure 15:
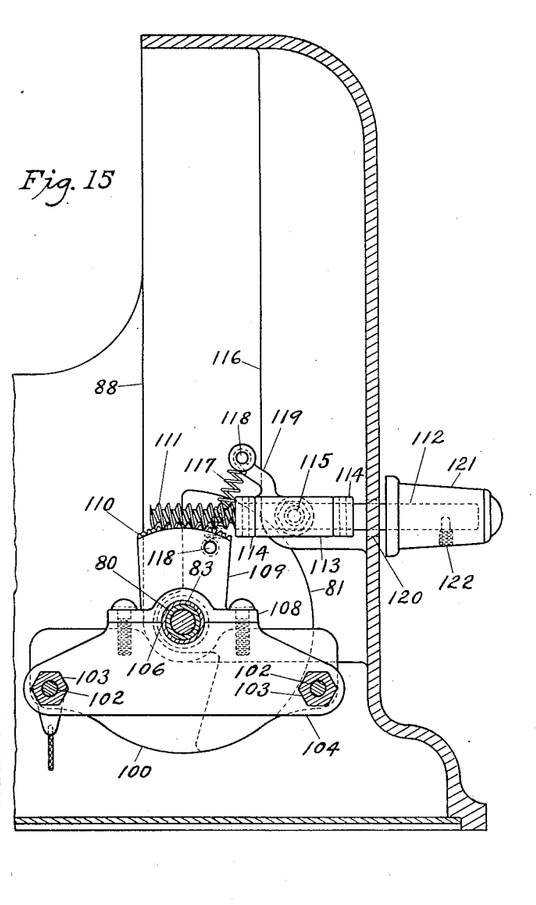
Fig. 15 is a cross-section taken on the line 15—15, Fig. 14.
Figure 16:
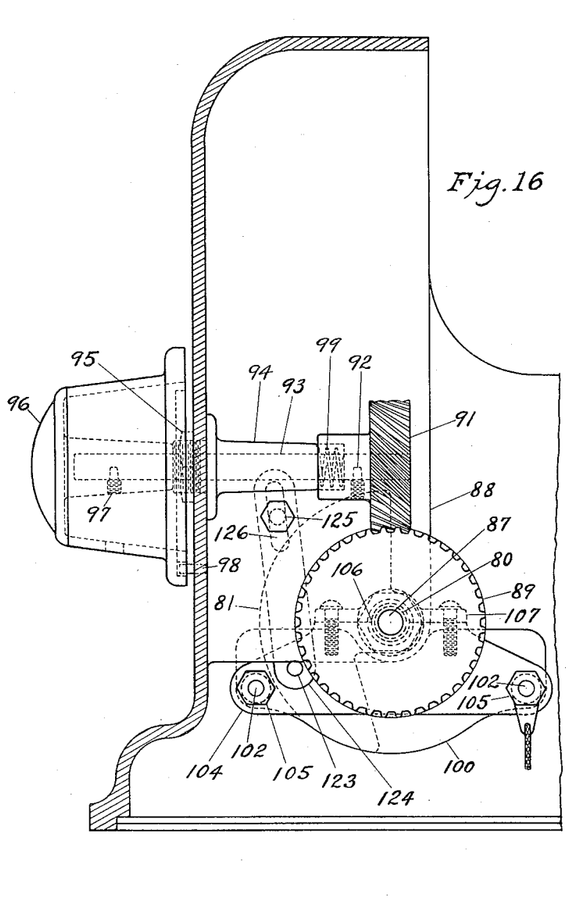

A control knob 56 is provided whereby the shaft may be revolved.

The three separate stator units each consists of a series of plates 57, spaced apart by washers 58 on studs 59 and held together by nuts 60. Heads 61 and 62, also carried on studs 59 and held by nuts 63, complete the stator units. A head 61 is shown in detail in Fig. 12, where holes 64 are suitably spaced to receive studs 59, and other holes 65 provide bearings whereby the completed stator units may be mounted as shown free to revolve about the rotor shaft. Collars 52 and 53 are suitably reduced in diameter where surrounded by bearings 65 to prevent endwise movement of the stator on the rotor shaft.

Stator head 62 is identical with head 61 except that it carries a segment 66 upon which gear teeth 67 are cut. Shafts 68 run parallel to rotor shaft 54 and carry pinions 69 which are positioned to engage teeth 67. Small knobs 70 are provided to rotate shafts 68. Two only of the three stator units include a head 62 having gear teeth 67. The other stator unit is then held against rotation by a plate 71, having a pin 72, which enters a hole in head 61. Bearings for shafts 54 and 68 are provided in panels 73 and 74 and a small bolt 75 thru a slot 76 in plate 71 and thru a hole in rear panel 74 permits of an initial adjustment of the one stator unit about the axis of rotor shaft 54, when desirable.

Pins 77 and 78 in the front panel 73 entering suitable annular grooves in knobs 56 and 70 limit rotative movement of the knobs, and short coil springs 79 supply sufficient drag to rotative movement of the shafts to maintain their positions when once set.

It may readily be seen that the several rotor units may be quickly set, to bring them into approximately the desired relation with the stator units by control knob 56, and that a finer adjustment may then be had by slowly adjusting the stator units with knobs 70, and while, in the instant case, two of the stator units are provided with control knobs and pinions for fine adjustment, one only, or all of the stator units, may be thus equipped if desired, and while for illustrative purposes I here show a triple condenser, a single, double or any multiple condenser may embody the means here employed for fine adjustment, and while, as bearings for the condenser shafts, I here employ holes in the front and rear panels of the cabinet wherein the condenser is housed, a separate or differently constructed frame carrying such bearings may be employed if desired.

In Figs. 13 to 17 inclusive I show an embodiment of my invention comprising a die molded radio receiver cabinet and a triple condenser, the cabinet being so formed as to provide bearings for the rotor shaft of the condenser and supports for the bearings of the auxiliary shafts, which are employed in connection with the condenser for fine adjustment, space additional to that required for the condenser being provided in the cabinet for other elements of the receiver.

A triple condenser is employed and, to facilitate assembly with the cabinet, the several units of the rotor are mounted on a tubular member 80, the rotor plates 81 being suitably spaced apart by washers 82 and collars 83, 84, etc., and held together by nuts 85.

A set screw 86 secures the assembled rotor to shaft 87 which, at one end, has bearing in the end wall of the cabinet, and at the other end, in a rib 88, molded as part of the cabinet. A helical gear 89 is secured to the end of shaft 87 by screw 90, and another helical gear 91 in mesh with the first gear is secured, by screw 92, to a shaft 93 which is at right angles to rotor shaft 87. Shaft 93 is supported by bearing 94 which is held in the front wall of the cabinet by nut 95. A control knob 96, secured to shaft 93 by screw 97, provides means whereby the rotor may be revolved.

Pin 98 extending from the front wall of the cabinet into an annular groove in the face of knob 96 limits rotative movement of said knob, and short coil springs 99 supply sufficient drag to shafts 87 and 93 to cause them to remain in position when set. The ratio of the gearing is such that a dial of considerably more than half of a circle may be used while the rotor turns thru but a half revolution, thus permitting greater space between dial graduations.

The three separate stator units each consists of a series of plates 100 spaced apart by washers 101 on studs 102 and held together by nuts 103. Heads 104, also carried on studs 102 and held by nuts 105, complete the stator units. Split bearings 106 are provided in heads 104 and collars 83 and 84 have annular grooves at their circumference so that, when caps 107 and 108 are removed and the bearings seated in said grooves and the caps again replaced, rotative movement of the stator about the rotor axis will be provided and endwise movement of the stators relative to the rotors prevented. The two caps 108 differ from caps 107 in that they carry an upwardly extending segment 109 wherein worm wheel teeth 110 are cut, corresponding worm threads to engage these teeth being cut at 111 on shafts 112 which are positioned at right angles to rotor shaft 87. Shafts 112 are supported, free to rotate, in bearing members 113 and are restrained from endwise movement therein by collars 114.

Stud portions 115 extending from members 113 have bearings in ribs 116 which are molded as part of the cabinet. Springs 117 are held somewhat extended by pins 118, one pin being in segment 109 and another in upwardly extending portions 119 of bearing members 113. Shafts 112 extend thru openings 120 in the front of the cabinet, the openings being considerable larger than the shaft, and small knobs 121 are fastened to said shafts by set screws 122.

The worm and worm wheel segments comprise means for fine adjustment of the stators to which they are attached and two stators only are thus equipped. The third is then held against turning movement about the rotor by a pin 123 extending into an opening in one head 104. Pin 123 is held supported by plate 124 which in turn is held to rib 88 by bolt 125. Plate 124 is slotted at 126 and thereby an initial adjustment of this stator may be made.

Figure 17:
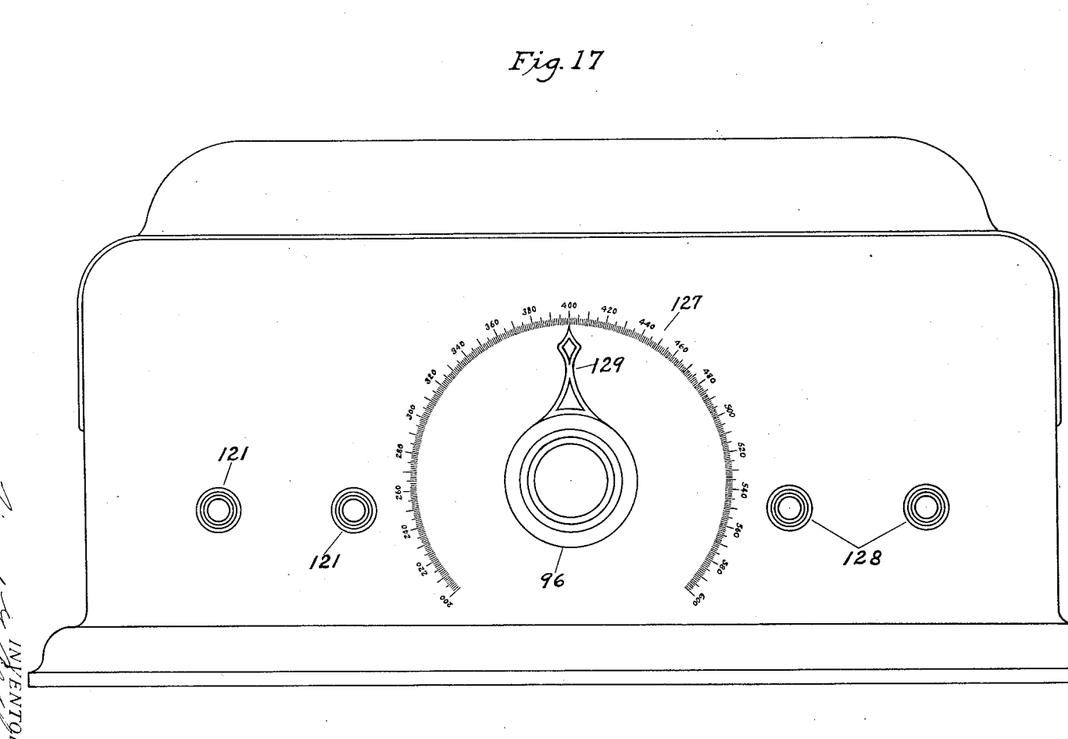
Fig. 17 shows a front view of the cabinet wherein the condenser is mounted and indicates the position of the control knobs whereby the condenser is operated.

Fig. 17 shows in reduced scale, the front of the cabinet within which the condenser is housed, the large dial 127 being molded as part of the cabinet. By reason of the fact that the auxiliary knobs 121 are at considerable distance from the main knob 96 a dial of exceptionally larger diameter is permitted, whereon a separate line for each wave length over the entire broadcast band may be had. To maintain a symmetrical appearance other small knobs may be placed as at 128 and used to control rheostat or similar instruments requiring such control.

A radio receiver embodying the mechanism shown in Figs. 13 to 17 inclusive is readily tuned by first turning knob 96 until hand 129 points to the desired wave length then separately adjusting small knobs 121. Since the worm threads 111 on shafts 112 are of relatively fine pitch considerable turning movement of the knobs 121 is required to move the stators small amounts, thus providing a high degree of selectivity. Springs 117 maintain a downward pressure on worm threads 111 to prevent backlash and, when a stator has been adjusted until it is considerably removed from its normal position, it is only necessary to press downward on knobs 121 when bearing members 113 will rock on studs 115, and worm threads 111 will be raised and withdrawn from worm wheel teeth 110, when springs 117 will return the stators to normal position.

While in Figs. 13 to 17 inclusive I show and describe an embodyment wherein a triple condenser is employed it is obvious that similar mechanism may be employed to obtain similar results in single, double or any multiple condensers and while but two of the stator units are here equipped with means for fine adjustment since one of the three condenser units is usually less critical in its adjustment, one or all of the stator units may be thus equipped for fine adjustment if desired, and while I herein use holes in the walls and ribs which are a part of the cabinet as bearings and bearing supports for the condenser, a separate or differently constructed frame may be employed to carry such bearings if so desired.

While in the drawings I illustrate only a condenser of the rotary type, it is to be understood that that principle of my invention, employing a rapid movement of one element for approximate adjustment and a relatively slow movement of the other element for fine adjustment, may be employed in condensers wherein the elements approach each other in a straight line, or wherein one element has circular and the other straight line movement.

Changes and modifications other and different from those suggested must be permitted, as long as they do not depart from the spirit of the invention the full scope of which I aim to clearly define in the following, wherein I claim—

1. A variable condenser having both elements revolable in either direction about one and the same axis, separate control knobs whereby each element may be revolved independently of the other, one of said knobs requiring considerably more turning movement for a given movement of the element which it controls than the other, whereby the one said element is revolved more slowly than the other element, and resilient means under stress holding said slowly movable element to a zero position but operable to be further stressed by rotation of said slowly movable element in either direction from said zero position.

2. A variable condenser having both elements movable in opposite directions, separate control knobs whereby each element may be moved independently of the other, the one knob operating thru gearing of high reduction ratio, so that said knob is adapted to slowly but accurately bring about exact relation between said elements, and a spring in tension holding the element operable by high reduction gearing to a zero position but operable to be further extended by movement of said element in either direction from said zero position.

3. A variable condenser comprising an element of one polarity adapted to be moved in opposite directions, an element of opposite polarity adapted to be moved independently of the first said element and in opposite directions, means for manually moving the element of the one polarity, a second means for manually moving the element of said opposite polarity, said second means requiring considerable more manual movement for a given movement of the element which it controls than the first said means, and resilient means under stress holding the said element of the said opposite polarity to a zero position but operable to be further stressed by movement of the said element in either direction from said zero position, and means for releasing the said second means after it has moved the said element of the said opposite polarity from its zero position to permit said resilient means to return said element to its zero position.

4. A variable condenser comprising an element of one polarity adapted to be moved in opposite directions, an element of opposite polarity adapted to be moved independently of the first said element and in opposite directions, a main control knob whereby the element of said one polarity may be moved, an auxiliary control knob whereby the element of said opposite polarity may be separately moved, reduction gearing of relatively high ratio joining the auxiliary knob to the element which it operates, whereby said element is adapted to more sensitive control than that controlled by the main knob, a spring under stress urging the said sensitively controlled element to a zero position, said spring being further stressed when said sensitively controlled element is moved in either direction by said gearing, and means to quickly unmesh said gearing to permit said spring to return said element to the zero position independently of said gearing.

5. A variable condenser comprising an element of one polarity adapted to be rotated in either direction, an element of opposite polarity adapted to be rotated independently of the first said element and in either direction, a main control knob to rotate element of said one polarity quickly to approximately the desired relation with said element of opposite polarity, an auxiliary control knob operating thru gearing of relatively high ratio to slowly, but accurately, bring the element of said opposite polarity into exactly the desired rotative relation with the elements of said one polarity, and a spring normally under stress keeping said gearing in mesh and said elements of opposite polarity at zero position, said spring being adapted to be further stressed when said element of opposite polarity is rotated in either direction from said zero position, and means to quickly unmesh said gearing to permit said spring to return said element of opposite polarity to its zero position.

6. A multiple variable condenser comprising a shaft carrying several rotor elements adapted for simultaneous rotation, bearings for said rotor shaft, an equal number of stator elements the end plates of which have bearing on and are free to revolve about said rotor, a main control shaft at right angles to the rotor shaft to operate said rotor shaft thru helical gears of low ratio to quickly set the rotor to approximately the desired relation with the stator elements, bearing for said main control shaft, auxiliary control shafts at right angles to said rotor shaft to operate said stator elements thru worm gearing of high ratio, to slowly but accurately bring said stator elements into exactly the desired relation with said rotor elements, bearings for said auxiliary control shafts, said bearings being so supported that they may be tilted to disengage the worm and worm wheel teeth, and spring means to return the stator elements to normal position when the worm teeth are disengaged and to return said worm teeth into contact.

7. The combination in a radio receiver, of a die molded cabinet having space within for the several elements of the receiver, a tuning dial molded as part of the cabinet, a multiple variable condenser comprising a shaft carrying several rotor elements adapted for simultaneous rotation having bearings in the walls of said cabinet, a corresponding number of stator elements the end plates of which have bearings on and are free to revolve about said rotor, a main control shaft at right angles to the rotor shaft having a bearing supported in the cabinet wall, carrying at one end a knob having a pointer to cooperate with the dial on said cabinet, and at the other end a helical gear to cooperate with a helical gear on the rotor shaft, said gears being of relatively low ratio, whereby said rotor may be quickly set to approximately the desired relation with the stator elements, auxiliary control shafts at right angles to the rotor shafts having auxiliary control knobs at their outer ends, worm threads at their inner ends and bearings to permit rotation of said shafts therebetween, said bearings being pivotally supported in the cabinet walls to rock, so that a downward pressure on said auxiliary control knobs will lift the worm thread ends, worm wheel teeth on the stator elements to cooperate with said worm threads, said worm gearing being of relatively high ratio whereby said stator elements may be slowly but accurately brought into exactly the desired relation with said rotor elements, and spring means to maintain engagement of the worm teeth and to return the stators to normal position when the worm teeth are disengaged.

In testimony whereof I hereunto set my hand.

VINCENT G. APPLE.